A. E. MILLER.
DISPLAY RACK.
APPLICATION FILED OCT. 11, 1915.
Reissued Oct. 22, 1918. 14,541.
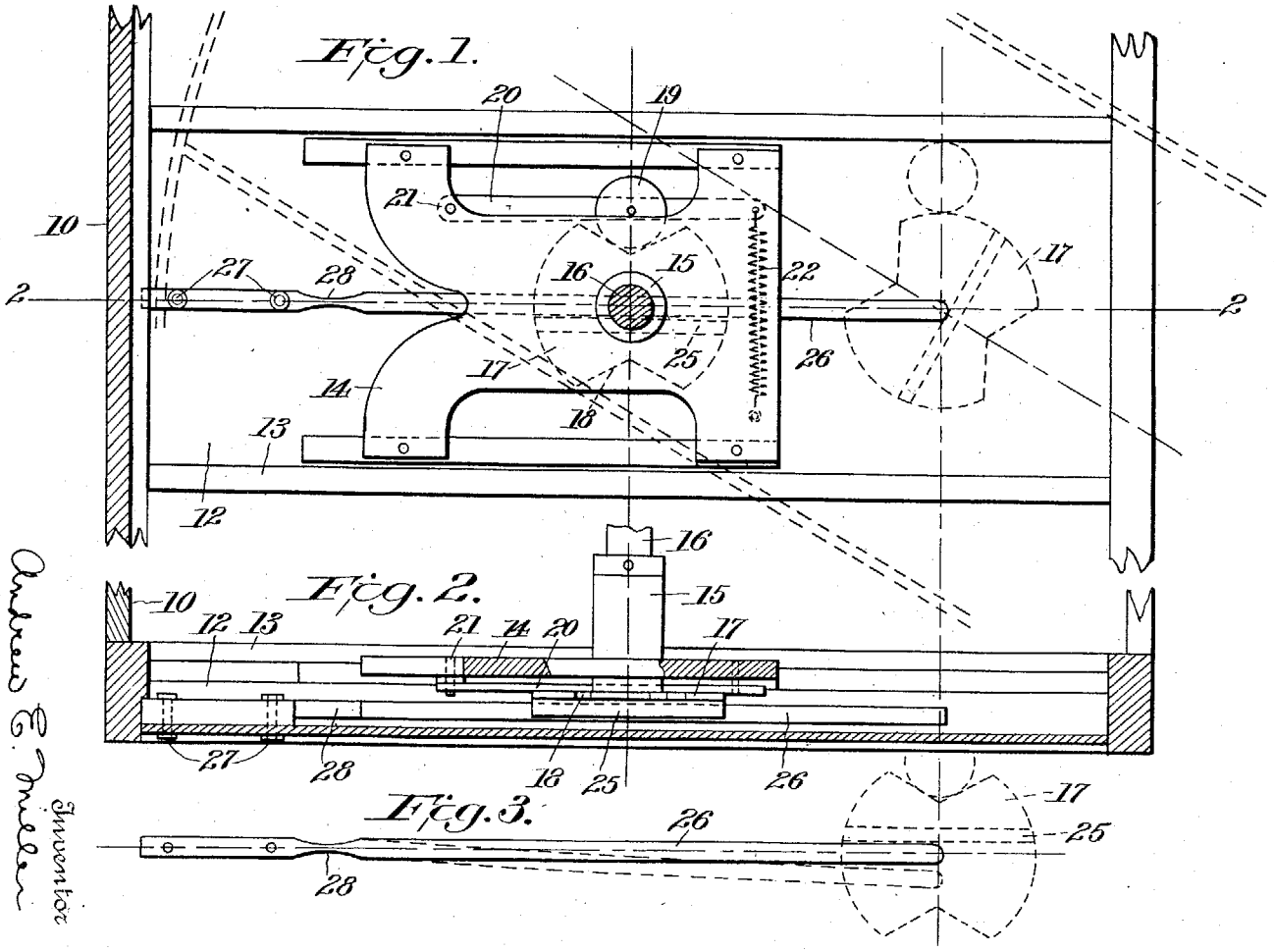
Inventor
Andrew E. Miller
By Hugh B. Hodges
Attorney
THE NORRIS PETERS CO., PHOTO-LITHO., WASHINGTON, D. C.

UNITED STATES PATENT OFFICE.

ANDREW E. MILLER, OF BALTIMORE, MARYLAND, ASSIGNOR TO SOLOMON HIMMEL, OF BALTIMORE, MARYLAND.

DISPLAY-RACK.

14,541. Specification of Reissued Letters Patent. Reissued Oct. 22, 1918.

Original No. 1,133,873, dated March 30, 1915, Serial No. 785,893, filed August 21, 1913. Application for reissue filed October 11, 1915. Serial No. 55,323.

*To all whom it may concern:*

Be it known that I, ANDREW E. MILLER, a subject of the King of Great Britain, residing at Baltimore, in the State of Maryland, have invented new and useful Improvements in Display-Racks, of which the following is a specification.

This invention relates to an improvement in display racks for garments and the like.

Heretofore it has been common practice to mount a rotatable rack upon a suitable carriage or other support, arranged to reciprocate within an inclosing case. In order to enhance the appearance of the case and to render the goods visible for display purposes while within the case, it is customary to form the walls of the latter of plate glass. Where the rack is free to rotate as the carriage or support moves back into the case, it has been found that there is some danger of the glass at the back of the case being broken by contact with the garment supporting rods of the rack. It is desirable therefore, in some forms of these racks, to provide means for preventing rotation of the rack as the carriage moves back and forth and also to prevent rearward movement of the rack until the latter has assumed a proper predetermined position with respect to the case.

One of the objects of the present invention is to provide an improved rack of this type in which the rack is locked against rotation during the reciprocation of the carriage.

A further object is to provide means for preventing inward movement of the carriage until the rack is in proper position with respect to the case.

A further object is to provide means for automatically causing the rack to assume its proper position with respect to the case as the carriage is moved inward.

The invention will be hereinafter fully set forth and particularly pointed out in the claims.

In the accompanying drawings:—

Figure 1 is a plan view of a portion of a display rack illustrating my invention, parts of the case being shown in section. Fig. 2 is a longitudinal sectional view on the line 2—2, Fig. 1. Fig 3 is a detail view illustrating the guide member.

Referring to the drawings, 10 designates a case of any suitable or preferred construction, the bottom of which is provided with a channel 12, the upper edges of which are provided with guides 13 between which the carriage 14 is mounted to reciprocate. Said carriage is provided with a tubular bearing 15 in which is rotatably mounted a shaft 16 designed to support the garment supporting bars or rods usually employed in display racks of this type, and which are not here illustrated. Secured to the shaft 16 is a disk 17 provided with notches 18 to receive a roller 19, carried by a lever 20, pivoted to the carriage at 21, said roller being normally held in engagement with the periphery of the disk 17 by a spring 22. The roller 19 coöperates with the notches 18 to normally prevent or retard the rotation of the shaft 16, the shape of the notches being such that as said roller starts to enter one of the notches 18, the supporting bars of the display rack are automatically brought into proper alinement with the rear wall of the case.

The underside of the disk 17 is provided with a depending guide rib 25 which normally lies parallel with the guide member 26 secured at its rear end to the bottom of the case by suitable fastening devices indicated at 27. The guide member 26 is cut away or reduced at 28 so as to permit of a slight flexibility of the forward portion thereof.

In practice, as the carriage is moved from its forward position back into the case and vice-versa, the guide rib 25 will engage the guide member 26 and normally prevent rotation of the rack. The guide member is sufficiently flexible, however, to permit a slight yielding of the parts in the event of undue pressure being applied tending to rotate the rack. When the carriage has been moved to its forward position the rack may be rotated through an arc of approximately 180°, the guide rib 25 swinging around the end of the guide 26, until it abuts against the opposite side of the latter. The rack may be returned while in this position or may be swung back to the original position as desired. It is obvious, however, that if the guide rib 25 extends diametrically across the end of the guide member 26, the carriage cannot be moved backward. If the rack has been rotated so as to bring the guide rib 25 in an inclined position with respect to the guide member, it will be readily seen that a rearward movement of the carriage will cause the guide member 26 to push against the guide rib 25, whereby the rack will be automatically righted as it is moved back. In display racks of this type which employ positioning or "self righting" devices considerable strain is brought upon the parts by reason of the fact that the momentum of the rack in its rotation under the power of the positioning device carries it beyond the desired predetermined position, with the result that the rack is subjected to a number of oscillations before coming to rest. In the present construction this objectionable feature is obviated. For instance when the roller 19 enters one of the notches 18 of the disk 17, to perform the positioning functions, the rib 25 has been moved relatively close to the guide 26, so that oscillation of the disk will be limited, and practically prevented just as soon as the rib 25 is in alinement with and abuts the guide 26.

Having thus explained the nature of my invention and described an operative manner of constructing and using the same, although without attempting to set forth all of the forms in which it may be made, or all of the forms of its use, what I claim is:—

1. An improvement in display racks comprising a reciprocably supported rotatable rack member, a single continuous and unbroken straight guide member, and means attached to the rack member positioned to selectively engage either side or one extremity of said guide member.

2. An improvement in display racks comprising a reciprocably supported rotatable rack member, a stationary guide member, and a single straight guide rib attached to said rack member and arranged to selectively engage either side and one extremity of said stationary guide member.

3. An improvement in display racks comprising a reciprocably supported rotatable rack member provided with a disk, a single straight guide rib depending from said disk and located to one side of the axis thereof, and means maintained in engagement with said rib for preventing rotation of said rack during reciprocation and for preventing rearward movement when the rack has been rotated from a predetermined position.

4. An improvement in display racks comprising a reciprocably supported rotatable rack member, provided with a disk, a single straight guide rib depending from said disk and located to one side of the axis thereof, and a guide member maintained in selective engagement with either side of said rib to prevent rotation of said rack member during reciprocation and for preventing rearward movement when the rack has been rotated from a predetermined position.

5. An improvement in display racks comprising a reciprocably supported rotatable rack member, a yieldable guide member, and a guide rib secured to said rack member, and shaped to selectively engage either side of said guide member to prevent rotation of said rack member.

6. An improvement in display racks comprising a reciprocable carriage, a rotatable rack member supported thereby, a yieldable guide member rigidly secured at one end, and provided with a reduced portion to render the free end thereof yieldable, and a guide rib secured to said rack member and shaped to engage either side of said guide member.

7. An improvement in display racks comprising a reciprocably supported rotatable rack member, a stationary guide member, and a straight guide rib attached to said rack member and arranged to selectively engage either side or one extremity of said guide member, and means for normally maintaining said rack in predetermined positions in its rotation.

8. An improvement in display racks comprising a reciprocably supported rotatable rack member, a stationary guide member, and a single straight guide rib attached to said rack member and coöperating with the outer end of the guide member to rotate the rack to a predetermined position when rearward movement is imparted thereto while in position contiguous to said end.

9. An improvement in display racks comprising a reciprocably supported rotatable rack member, a stationary guide member, positioning means for maintaining the rack in a predetermined rotative position, and means coöperating selectively with either side of said guide member to prevent oscillation of the rack member when operated by the positioning means.

10. An improvement in display racks comprising a reciprocably supported rotatable rack member, a stationary guide member, positioning means, and a single guide rib carried by the rack member and positioned to selectively engage either side of the guide member to prevent oscillation of the rack when operated by the positioning means.

11. An improvement in display racks comprising a reciprocably supported rotatable rack member, a stationary guide member, positioning means for the rack member including a disk attached to said rack member, and a guide rib attached to said disk and offset from the axis thereof, said rib being positioned to engage the guide member to prevent oscillation of the rack member when operated by the positioning means.

In testimony whereof I have hereunto set my hand in the presence of two subscribing witnesses, at Baltimore, Maryland, this 6th day of October, 1915.

ANDREW E. MILLER.

Witnesses:
EDWIN BURGESS,
J. R. EADER.

Copies of this patent may be obtained for five cents each, by addressing the "Commissioner of Patents, Washington, D. C."